United States Patent Office.

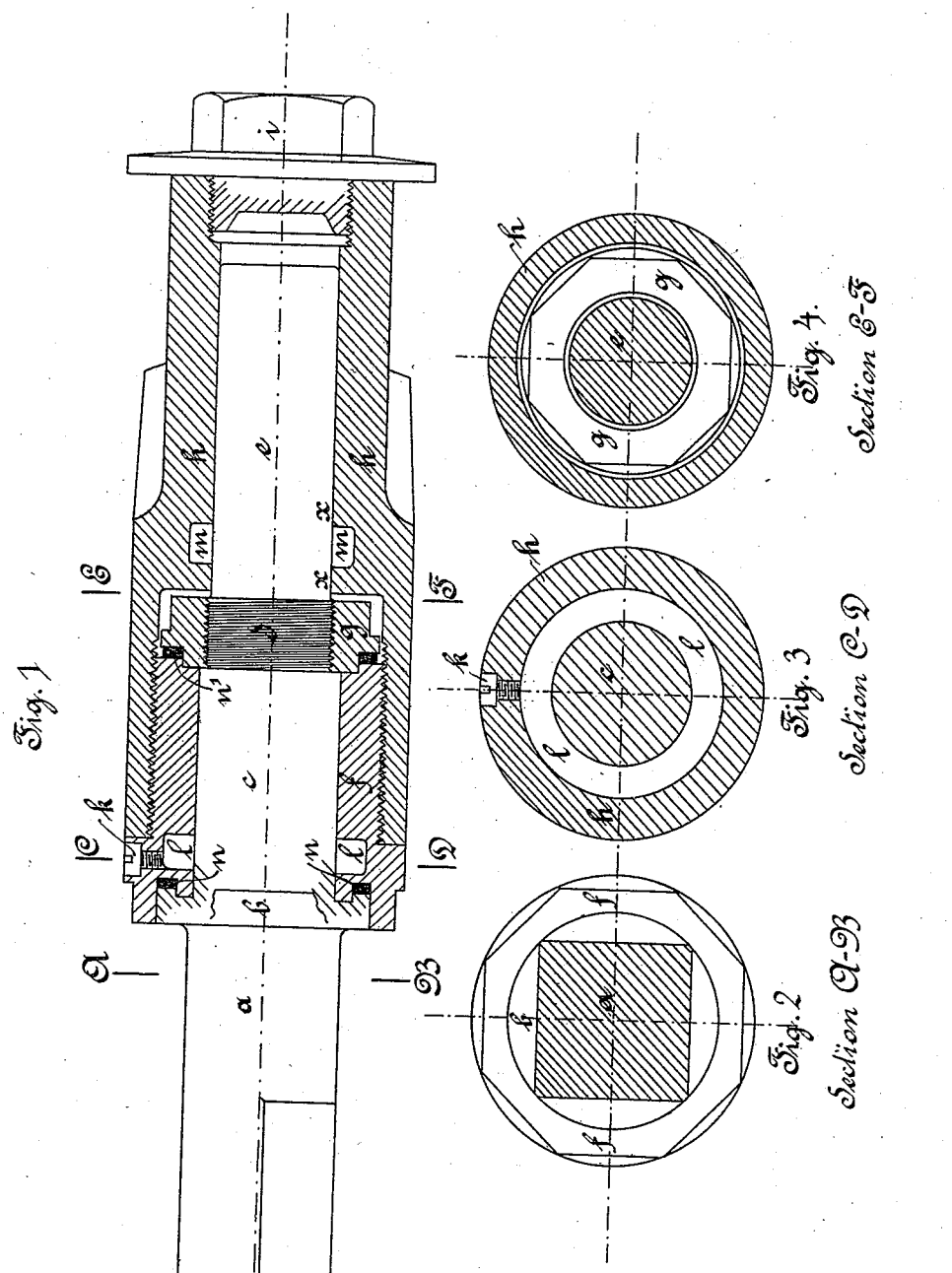

HERRMANN SCHUBERT, OF BERLIN, GERMANY.

AXLE-BOX.

SPECIFICATION forming part of Letters Patent No. 512,752, dated January 16, 1894.

Application filed March 25, 1893. Serial No. 467,555. (No model.)

*To all whom it may concern:*

Be it known that I, HERRMANN SCHUBERT, a subject of the King of Prussia and German Emperor, residing at Berlin, Prussia, Germany, have invented certain new and useful Improvements in Axle-Boxes; and I do hereby declare the following to be a full, clear, and exact description of the invention, such as will enable others skilled in the art to which it appertains to make and use the same.

This invention is designed to do away with various drawbacks in the axles and axle boxes at present in use. These drawbacks partially consist, first, in that the pressure of the wheel is mainly exerted on the band or axle washer placed at the commencement of the axle shaft, and consequently a rapid wearing away takes place there, which results in a great loss of lubricating substance; secondly, in the circumstance that the removal of the wheel from the axle is only possible by loosening several screw bolts which penetrate the nave, which is both inconvenient and takes up a deal of time, and has the drawback that owing to the frequent knocking out of the screw bolts from the wood of the nave, this latter particularly is much strained and therefore soon becomes useless; and, thirdly, in that the lubricating chamber formed in the bush can only contain very little of the necessary lubricant, which is particularly unpleasant when the bush is already somewhat worn.

On the accompanying drawings—Figure 1 is a longitudinal section through the axle box and Figs. 2 to 4 are cross sections on the given sectional lines A B, C D, E F, respectively.

$a$ is the axle, while the actual axle shaft is formed of two cylindrical parts $c$ and $e$ of different diameters, between which the screwed part $d$ further lies, while the shoulder ring $b$ forms the closing piece or cap toward the axle. The bush $h$ is then fastened on the axle by the screwed intermediate piece $f$ being secured against any movement in an axial direction by means of the nut $g$. The various screws are of course cut either with a right or left hand thread in such a way that they are tightened by the revolution of the wheels when traveling.

The essential point of the invention consists in the front part of the bush being separated from the rear one, and both being only connected with one another by means of a screw thread, so that if $f$ and $h$ fit equally well on their respective parts of the axle shaft, a full weighting of the intermediate piece $f$ by the pressure of the wheel can only take place when the slight play which the screw piece must have in its screw thread has disappeared and the metal of both bodies rests directly on it. The consequence of this is that the pressure must be applied always earlier, that is to say stronger at $x$, before it can well act on the intermediate piece $f$. This has the further advantage of causing the strongest wear only to take place where it does the least damage, that is to say where the interstice, resulting therefrom, will not permit the lubricant to run out, or the dust and dirt to penetrate.

A further improvement in the axle box is that both the stronger as well as the slighter parts of the axle shank have separate lubricating chambers $l$ and $m$, and that the chamber $l$ of the intermediate piece $f$ may be entirely filled without it being necessary to remove this piece from the axle, by unscrewing the closing screw $k$ and filling the chamber by means of an oil can. The lubricating chamber $m$ will also be pressed full of oil on the wheel being replaced, if enough oil has been poured into the axle box when the wheel is taken off.

Further, $n$ and $n'$ are leather washers which close tightly, both to the outside as well as toward the thin part, the larger part of the axle, that is to say, that in which the lubricant needs to be most carefully retained.

$i$ is a screw cap for the box which holds the latter firmly in the wooden nave by means of its broad disk shaped edge. The removal of the wheel from the axle is then simply performed by holding firmly the intermediate piece $f$ on its octagonal part by means of a suitable key and turning the wheel backward.

What I claim is—

The combination, with an axle provided with a shoulder $b$, two bearings $c$ and $e$ of different diameter, and a screwthreaded portion $d$ between the said bearings; of the externally screw-threaded bush $f$ consisting of a solid tube journaled on bearing $c$ and provided with the oil chamber $l$; a removable bush $h$ for carrying the wheel, provided with a separate oil chamber, screwed onto the bush $f$ and journaled on the bearing $e$; the nut $g$ screwed onto the said portion $d$ against the shoulder at the end of the bearing $c$ and holding the bush $f$ in position longitudinally, and the washers $n$ and $n'$ interposed between the ends of the bush $f$ and the shoulder $b$ and the nut $g$ respectively, substantially as set forth.

In testimony whereof I have affixed my signature in presence of two witnesses.

HERRMANN SCHUBERT.

Witnesses:
OSCAR SCHMIDT,
JEAN PAUL SCHMIT.